United States Patent
Zhevelev et al.

(10) Patent No.: US 10,718,147 B2
(45) Date of Patent: Jul. 21, 2020

(54) OPTICAL DISPLACEMENT DETECTOR WITH ADJUSTABLE PATTERN DIRECTION

(71) Applicant: Tyco Fire & Security GmbH, Neuhausen am Rheinfall (CH)

(72) Inventors: Boris Zhevelev, Rishon Le Zion (IL); Eli Litvak, Netanya (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 113 days.

(21) Appl. No.: 15/947,036

(22) Filed: Apr. 6, 2018

(65) Prior Publication Data
US 2019/0309557 A1 Oct. 10, 2019

(51) Int. Cl.
| | |
|---|---|
| *G01D 5/32* | (2006.01) |
| *E05F 15/43* | (2015.01) |
| *G01D 11/24* | (2006.01) |
| *G08B 13/08* | (2006.01) |
| *G01S 7/481* | (2006.01) |
| *G08B 13/181* | (2006.01) |
| *G08B 29/22* | (2006.01) |

(52) U.S. Cl.
CPC ............ *E05F 15/43* (2015.01); *G01D 5/32* (2013.01); *G01D 11/245* (2013.01); *G01S 7/4813* (2013.01); *G08B 13/08* (2013.01); *E05F 2015/434* (2015.01); *G08B 13/181* (2013.01); *G08B 29/22* (2013.01)

(58) Field of Classification Search
CPC .................................. G03B 17/561; G03B 2205/0023; G03B 5/00; E05Y 2400/44
See application file for complete search history.

(56) References Cited

U.S. PATENT DOCUMENTS

| | | | |
|---|---|---|---|
| 4,443,107 A | | 4/1984 | Alexander et al. |
| 5,473,368 A | * | 12/1995 | Hart ............... G08B 13/1963 348/155 |
| 5,912,619 A | | 6/1999 | Vogt |

(Continued)

FOREIGN PATENT DOCUMENTS

EP          3 101 444          5/2008

OTHER PUBLICATIONS

Extended European Search Report issued for corresponding European Application No. 19167693.1 dated Aug. 22, 2019.

(Continued)

*Primary Examiner* — Thanh Luu
(74) *Attorney, Agent, or Firm* — Arent Fox, LLP

(57) ABSTRACT

A system and method for an optical displacement detector system with adjustable pattern direction are disclosed. In an embodiment, the detector system includes a mounting bracket and a sensor assembly. The sensor assembly includes a housing, and a sensor module in the housing. The sensor assembly can be rotated with respect to the mounting bracket to adjust an optical axis of the sensor module. In another embodiment, the detector system includes a turntable that enables additional adjustment of the optical axis. Such a system significantly improves installation of these detector systems as compared to existing optical displacement detector systems, which have fixed optical axes. In one application, the detector system is installed in a door system having a door and door frame, and detects displacement of the door.

21 Claims, 9 Drawing Sheets

(56) References Cited

U.S. PATENT DOCUMENTS

| | | | |
|---|---|---|---|
| 6,331,964 | B1 | 12/2001 | Barone |
| 6,515,754 | B2 | 2/2003 | Ookubo |
| 7,196,510 | B2 | 3/2007 | Kawatoko |
| 7,946,392 | B2 | 5/2011 | Rotboll |
| 8,274,037 | B2 | 9/2012 | Ritter et al. |
| 8,970,373 | B2 | 3/2015 | Buckley et al. |
| 9,250,714 | B2 | 2/2016 | Hiromi et al. |
| 9,576,449 | B2 | 2/2017 | Smith |
| 2006/0269278 | A1* | 11/2006 | Kenoyer ............ F16M 11/10 396/428 |
| 2007/0041724 | A1* | 2/2007 | Araki ............ F16M 11/10 396/419 |
| 2007/0274706 | A1* | 11/2007 | Cheng ............ G03B 17/00 396/427 |
| 2009/0021634 | A1* | 1/2009 | Chang ............ H04N 5/2252 348/372 |
| 2010/0128259 | A1 | 5/2010 | Bridges et al. |
| 2011/0242315 | A1* | 10/2011 | Barley ............ G03B 17/02 348/143 |
| 2015/0206415 | A1 | 7/2015 | Wegelin et al. |
| 2016/0134838 | A1* | 5/2016 | Tangeland ............ H04N 7/142 348/14.09 |
| 2016/0165323 | A1 | 6/2016 | Hollis |
| 2016/0358430 | A1 | 12/2016 | Smith |
| 2017/0057423 | A1* | 3/2017 | Wang ............ B60R 11/04 |
| 2018/0202804 | A1* | 7/2018 | Dumble ............ G01B 21/24 |
| 2018/0278910 | A1* | 9/2018 | Schoenberg ........ G01S 17/107 |

OTHER PUBLICATIONS

"AN07—epc600—Handbook Time-of-flight range fmder chip" ESPROS Photonics Corporation, 1-28 (2014).

"Doors & Gates Industry—Cedes" http://www.fbselektronik.com/doors-gates-industry-cedes.html, 1-5 (2017).

"IRMA 3D" iris Infrared Intelligent Sensors (2016).

"Tailgate Detector TDflextm M2S" IEE S.A., Version 5, 1-98 (2013).

Windl, R., et al., "Contactless and Absolute Linear Displacement Detection Based Upon 3D Printed Magnets Combined with Passive Radio-Frequency Identification," 1-4 (2017).

* cited by examiner

OPTICAL DISPLACEMENT DETECTOR WITH ADJUSTABLE PATTERN DIRECTION

BACKGROUND OF THE INVENTION

Displacement detector systems are commonly used in many intrusion systems, and in security systems more generally. Most often, these detector systems are used to detect whether doors or windows are ajar or secured. A typical application for these detector systems is a door system that includes a door frame and a door. More generally, however, these detector systems can be used in other applications that require proximity and/or end position sensing, distance measurements such as nano-distance measurements, or moving part position sensing.

In these intrusion/security systems, the displacement sensor systems are typically monitored by a system control panel via a network. In this way, the control panel can monitor whether doors or windows are ajar or secured, for example.

Displacement detector systems are often constructed as two major pieces that work together as a pair. The two pieces are separated by a distance when installed. In these two-piece detector systems, one piece is mounted to a fixed surface, such as a door frame, and the other is attached to a traveling/moving object, such as a door. In a reed switch displacement detector system, for example, a reed switch as one piece is typically mounted to a door frame, and a magnet as the other piece is mounted to a door. When the magnet is brought into proximity of the reed switch, such as when the door is closed, the reed switch becomes conductive. A control panel connected to the reed switch can then monitor for changes in the conductivity of the reed switch to determine whether the door has opened. Other examples of two-piece detector systems include: a capacitive detector system having a capacitive sensor and a capacitance influence element as the two pieces; an inductive detector system having an induction sensor and an induction influence element as the two pieces; and an optical detector system having a light source and light sensor integrated within one piece, and a light reflector as the other piece.

Some displacement detector systems are also implemented as one-piece detector systems. Examples of these one-piece systems include one-piece accelerometer detector systems and one-piece optical detector systems.

An example of how a one-piece accelerometer detector system is installed at and operates within a door system is as follows. The detector system is usually installed by including the detector within a mortise of the door, but could also be mounted upon a surface of the door. When mounting the detector system upon the door, holes are drilled on the door's surface, and holes in a base of the detector system are aligned with the holes drilled in the door. Screws then fasten the base of the detector system to the door. When acceleration of the door exceeds a threshold, an accelerometer of the detector system is activated, thus detecting displacement of the door.

A one-piece optical detector system is typically installed at a door system as follows. The detector system is usually installed by mounting the detector system to the door frame, but could also be mounted to a surface of the door. The mounting of the optical detector system to the door frame or door is typically carried out in a similar fashion as the surface mounting of the accelerometer detector system described herein above.

Once mounted, the one-piece optical detector system generally operates as follows. The optical detector system has an integrated light source and light sensor. The light source emits a beam of light along a fixed optical axis to an object, such as to the door. The beam of light impinges upon a surface of the door, and the light sensor measures light reflected back from the door to determine a distance to the door. For the detector system to operate properly, the beam of light must impinge upon the door over a required travel range of the door. The optical detector system typically measures a distance to a closed door as a reference measurement, and compares new distance measurements obtained over time to the reference measurement to detect displacement of the door (i.e. to determine whether the door has opened).

SUMMARY OF THE INVENTION

Installation of existing optical detector systems can be challenging for several reasons. First, the optical axes of the light sources in these detector systems might be fixed. In order for these detector systems to detect displacement of objects, installers must change the mounting locations of these detector systems during installation when the emitted beams of light do not properly impinge upon the objects. When the application is a door system, for example, installers use a trial and error approach during mounting of these detector systems to ensure that the light beams properly impinge upon the doors over the required travel range of each door. This is labor-intensive and inefficient. Second, the light sensors of these systems are susceptible to parasitic reflection from neighboring objects, which can create false or incorrect measurements. As a result, installers must also position these optical detector systems during installation to avoid stray light, which also adds to installation cost and complexity. Finally, in applications where aesthetics are important, the experience level of the installer is a factor for minimizing changes to mounting locations during installation.

A proposed detector system overcomes the installation challenges posed by existing optical detector systems. For this purpose, the proposed detector system has an adjustable optical axis, along which the detector system emits one or more beams of light. An installer can adjust how the beams of light emitted from the detector system impinge upon an object by adjusting the optical axis. In this way, once the installer has selected the proper installation location for the detector system, the installer can mount the detector system in place, and then adjust its optical axis without having to re-mount/adjust the mounting of the detector system.

In general, according to one aspect, the invention features a displacement detector system. The detector system includes a mounting bracket and a sensor assembly. The sensor assembly includes a housing, and a sensor module in the housing. The sensor assembly can be rotated with respect to the mounting bracket to adjust an optical axis of the sensor module.

Preferably, the mounting bracket includes a base and two arms projecting from either end of the base, wherein the sensor assembly is held between the two arms. The arms of the mounting bracket have recesses that receive bosses of the housing of the sensor assembly.

The detector system also includes a sensor assembly fixing system. The sensor assembly fixing system prevents rotation of the sensor assembly in the mounting bracket. In one example, the sensor assembly fixing system is a set screw.

Typically, the housing of the sensor assembly includes a body portion and a window that is set in the body portion.

The sensor module is then mounted behind the window. Preferably, the housing is generally cylindrical.

In an embodiment, the detector system also includes a turntable. The mounting bracket is mounted to the turntable, and the turntable includes a turntable fixing system for preventing the rotation of the turntable.

In general, according to another aspect, the invention features a method of installing a displacement detector system. The method comprises rotating a sensor assembly held in the mounting bracket to adjust an optical axis of a sensor module of the sensor assembly, and fixing the sensor assembly in the mounting bracket.

In one example, rotating of the sensor assembly includes pointing the optical axis upon an object for detecting displacement relative to the object. In addition, fixing the sensor assembly in the mounting bracket typically includes fixing the optical axis upon an object for detecting displacement of the object.

In another example, fixing the sensor assembly in the mounting bracket includes using a sensor assembly fixing system for preventing the rotation of the sensor assembly with respect to the mounting bracket.

The method further comprises rotating a turntable attached to the mounting bracket to further adjust the optical axis. Here, rotating of the sensor assembly adjusts the optical axis in a first plane, and rotating of the turntable adjusts the optical axis in a second plane that is different from the first plane. The turntable can also be fixed, where fixing the turntable includes using a turntable assembly fixing system for preventing the rotation of the turntable.

In general, according to yet another aspect, the invention features a displacement detector system. The detector system includes a cylindrical sensor assembly and a bracket for mounting the sensor assembly.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
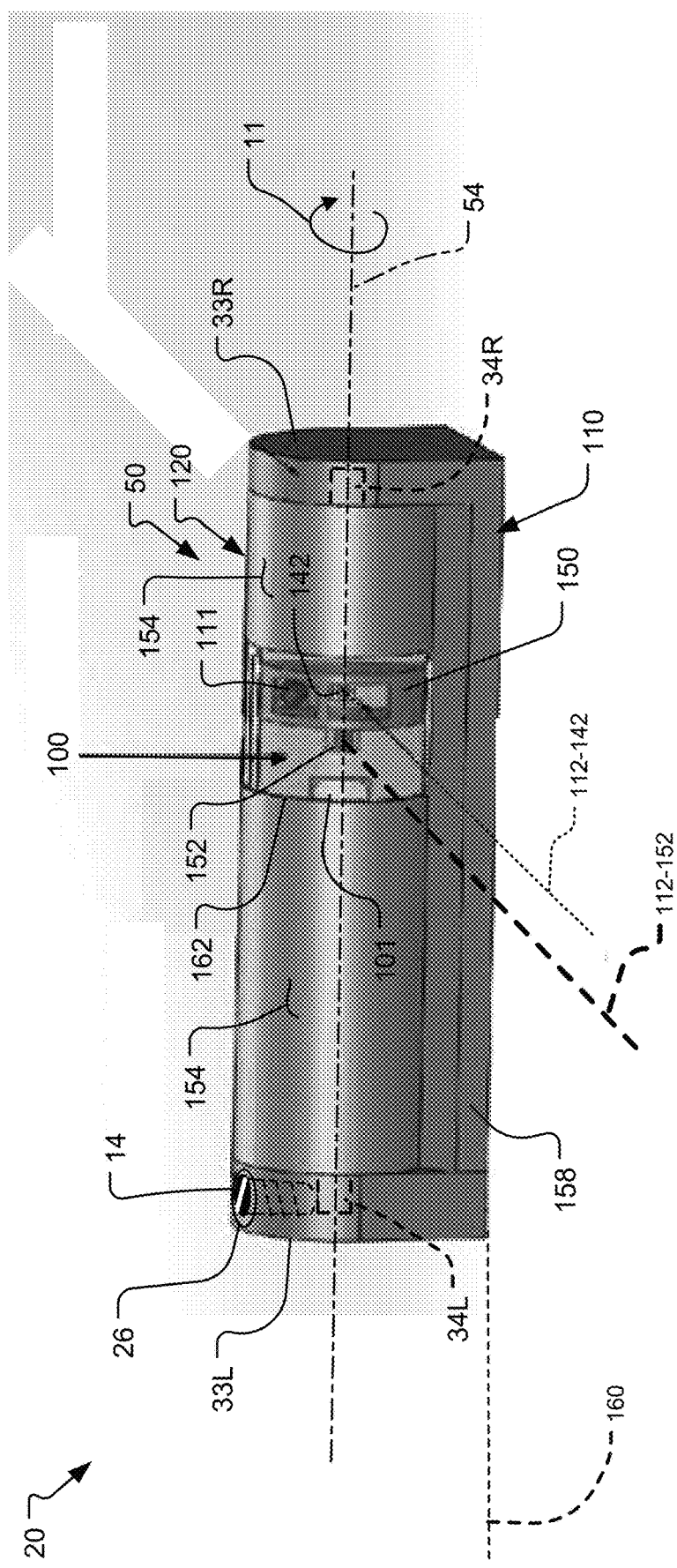
FIG. 1 is a scale perspective view of a displacement detector system constructed in accordance with principles of the present invention.

FIG. 1 shows an embodiment of a detector system 20. The detector system 20 includes a sensor assembly 50 and a mounting bracket 110. The sensor assembly 50 includes a housing 120, and a sensor module 100 in the housing. Additionally, the sensor assembly 50 can be rotated with respect to the mounting bracket to adjust an optical axis 112 of the sensor module 100. In a preferred embodiment, the sensor assembly 50 is generally cylindrical in shape.

The housing 120 has various components. The housing has bosses 34L and 34R located on either end of the housing, a cylindrical body portion 154, and a protective window 162. The window 162 is set in the body portion 154 and is flush with the contour of the body portion 154, and the sensor module 100 is mounted behind the window 162.

The protective window 162 protects the sensor module 100 from dirt and dust. The window 162 is made from a transparent material such as plastic or glass. The protective window 162 is typically at an angle with respect to a face of printed circuit board (PCB) 150 of the sensor module 100 to eliminate/minimize stray light from reflecting off an inside surface of the window 162 and then entering the analyzing sensor 152.

The mounting bracket 110 has a base 158 and two arms, 33L and 33R. The arms 33 project from either end of the base 158, such that the sensor assembly 50 is held between the two arms 33. The arms 33, in turn, have recesses that receive the bosses 34 of the sensor assembly 50. The sensor assembly 50 is able to rotate around an axis of rotation 54 with respect to the mounting bracket 110. A plane 160 of the base 158 and an exemplary direction of rotation 11 of the sensor assembly 50 are also shown.

The sensor module 100 includes various components. As shown in the illustrated example, the components include a time of flight analyzing sensor 152, a trigger sensor 142, a battery 101, and system state light emitting diode (LED) 111. The time of flight analyzing sensor 152 and the trigger sensor 142 are mounted to the printed circuit board 150. The trigger sensor 142 is used to detect real door or asset movement or other possible causes, which is realized by an optical proximity sensor (OPS) or accelerometer, in examples. Preferably, the trigger sensor 142 is an OPS, as shown.

In the illustrated example, the time of flight analyzing sensor 152 and the trigger sensor 142 have optical axes 112-152 and 112-142, respectfully. The time of flight analyzing sensor 152 and the trigger sensor 142 emit beams of light along their respective optical axes 112-152 and 112-142. The optical axes 112-142 and 112-152 are close in distance to one another and are substantially parallel to one another. In this way, from the viewpoint of an installer, these optical axes 112-142 and 112-152 operate as a combined optical axis 112 of the sensor module 100. The installer also sees the beams of light emitted by the time of flight analyzing sensor 152 and the trigger sensor 142 as a combined beam of light emitted by the sensor module 100.

During installation, an installer typically mounts the detector system 20 to a fixed surface. The fixed surface is adjacent to the moving object that is the target of the detector system 20. Using the example of a door system that includes a door frame and a door, the installer typically mounts the detector system 20 by attaching the base 158 of the mounting bracket 110 to the door frame or a wall adjacent to the door. Different configurations for installing the detector system 20 for use in a door system are possible. Example configurations for installing the detector system in a door system are shown in FIGS. 3A, 3B, 4A, and 4B, the descriptions of which are included herein below. Alternatively, the installer might also install the detector system 20 by attaching its mounting bracket 110 to the moving object (i.e. door).

After installation, the installer then must calibrate the detector system 20. Calibration is required to properly detect displacement of the object that the detector system 20 was installed to detect. Calibration ensures that the combined beam of light emitted by the sensor module 100 properly impinges upon the object that is the target of the detector system 20. For this purpose, the installer rotates the sensor assembly 50 in the mounting bracket 110 to adjust its combined optical axis 112.

The detector system 20 also includes a sensor assembly fixing system. An installer uses the sensor assembly fixing system to fix the rotation of the sensor assembly 50 after completing calibration/adjustment of the optical axis 112. The sensor assembly fixing system prevents rotation of the sensor assembly 50 in the mounting bracket 110. In examples, the sensor assembly fixing system is a set screw 14 that the installer tightens with a screwdriver or other tool, or a thumbscrew that the installer can tighten by hand. In this example, the set screw 14 extends through a threaded bore 26 in arm 33L of the mounting bracket 110.

The installer tightens the set screw 14 until the boss 34L of the sensor assembly 50 is secured within the arm 33L. As a result, further rotation of the sensor assembly 50 is prevented and the combined optical axis 112 is fixed.

The trigger sensor 142 is preferably an OPS that is used to detect real door or asset movement or other possible causes. An OPS typically emits an electromagnetic field or a beam of electromagnetic radiation (e.g. infrared) towards a target surface. In one example, the beam is a pulsed signal. The beam impinges on the target surface and is reflected back to the OPS, and changes in the waveform of the reflected beam are measured to determine proximity to the target surface. In one example, an amplitude of the reflected beam is measured and compared to a reference value.

In the proposed detector system 20, the OPS trigger sensor is used to detect movement/determine an indication of movement of a door relative to a door frame, for example. The trigger sensor 142 consumes much less power than the analyzing sensor 152. Upon detecting movement/determining an indication of movement, the trigger sensor 142 activates the analyzing sensor 152.

The analyzing sensor 152 is then used to measure range. In one example, the analyzing sensor is a VL6180X sold by STMicroelectronics. This sensor measures absolute distance independent of target reflectance by measuring the time that light transmitted by the sensor 152 takes to travel to the nearest object and reflect back to the sensor (Time-of-Flight). The VL6180X includes an infrared (IR) emitter, a range sensor, and an ambient light sensor. This sensor also rejects the visible light and provides optical cross talk compensation for cover glass. The analyzing sensor should be able to measure range starting from at least 1 centimeter (cm).

In another embodiment, the sensor module 100 includes only the range detecting analyzing sensor 152. Here, the sensor module 100 emits a single beam of light from the analyzing sensor 152, along optical axis 112-152. However, because many range measuring sensors consume too much power, this embodiment is less preferred when the detector system 20 is battery operated, for example.

The range measuring analyzing sensor 152, in one example, measures the range (e.g. distance) from its installation location on a window or door to an adjacent window or door frame member. When the distance between the analyzing sensor and the window or door frame member increases above a certain threshold, this will indicate the window or door is open.

Figure 2A:
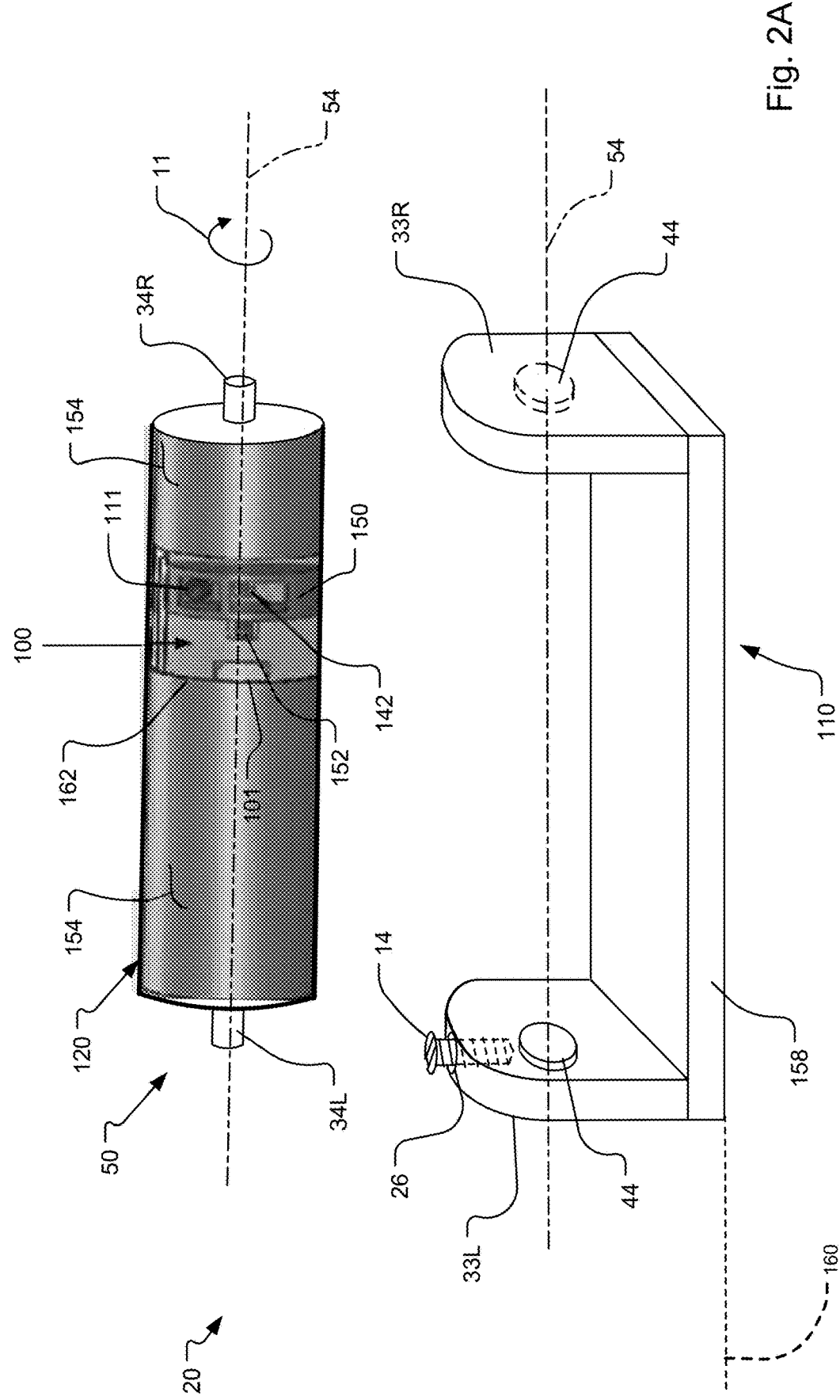
FIG. 2A is an exploded view of the detector system in FIG. 1, where a sensor assembly and a mounting bracket of the detector system are shown.

FIG. 2A provides more detail for the detector system 20.

In the illustrated example, the arms 33 of the mounting bracket 110 each have recesses 44 that receive the bosses 34 of the sensor assembly. The recesses 44 enable the bosses 34L and 34R to be seated within/held by the arms 33L and 33R, respectively, and also allow rotation of the sensor assembly 50 within the mounting bracket 110. As a result, the sensor assembly 50 is able to rotate in exemplary direction of rotation 11 around the axis of rotation 54 with respect to the mounting bracket 110.

An installer rotates the sensor assembly 50 about the axis of rotation 54 to point the optical axis 112 upon an object for detecting displacement of the object. By pointing the optical axis 112 upon an object such as a door, the installer can verify that that the beam of light emitted along the optical axis 112 by the sensor module 100 properly impinges upon the door. For this purpose, in one example, the installer might define a closed door position and an open door position of the door, and verify that the beam of light emitted along the optical axis 112 impinges upon measuring points located upon the door at both the closed door and open door positions.

Once the installer is satisfied with the pointing of the optical axis 112, the installer can then fix the sensor assembly 50 in the mounting bracket 110. The installer fixes the sensor assembly 50 to fix the optical axis 112 upon an object for detecting displacement of the object.

The range measuring analyzing sensor 152 is preferably located on the printed circuit board (PCB) 150 and is oriented to a reference surface, such as a door frame, for example. An infrared (IR) LED of the analyzing sensor 152 emits light that impinges upon a door frame or other surface, and light reflected back from the surface arrives at the sensor 152. The analyzing sensor 152 measures the distance between itself and the door frame/other surface, based upon the time of flight between the time at which the light is emitted and the time at which the reflected light is received. This distance should be within some range that was learned after power up and/or as part of a periodic calibration of the range. For example, if the measured distance has increased beyond an allowed range, that will indicate that the door is open. However, if the distance is within range of the value associated with the initial position of the door or calibrated position of the door, that will indicate that the door is again closed.

The sensor module 100 preferably combines an analyzing sensor 152, which can have a high power consumption, with a trigger sensor 142 that is low in power/current consumption. The analyzing sensor 152 is normally in a low power or "sleep" mode. However, the analyzing sensor 152 might also be completely turned off if the sensor's wake-up time is optimized such that the sensor 152 does not miss any door open/door close events. In one example, the trigger sensor 142 is simply a movement detecting sensor. It could be almost any existing solution to detect movement. In one implementation, the trigger sensor 142 is an optical proximity sensor comprising an IR emitter and photodiode that will detect movement upon sensing a change to a portion of reflected light. The main function of this trigger sensor 142 is to provide a signal to trigger the range measuring analyzing sensor 152 from sleep or to turn its power on. However, the trigger sensor 142 also can be used for other functionality, such as measuring reflection amplitude to help with spoofing prevention.

Figure 2B:
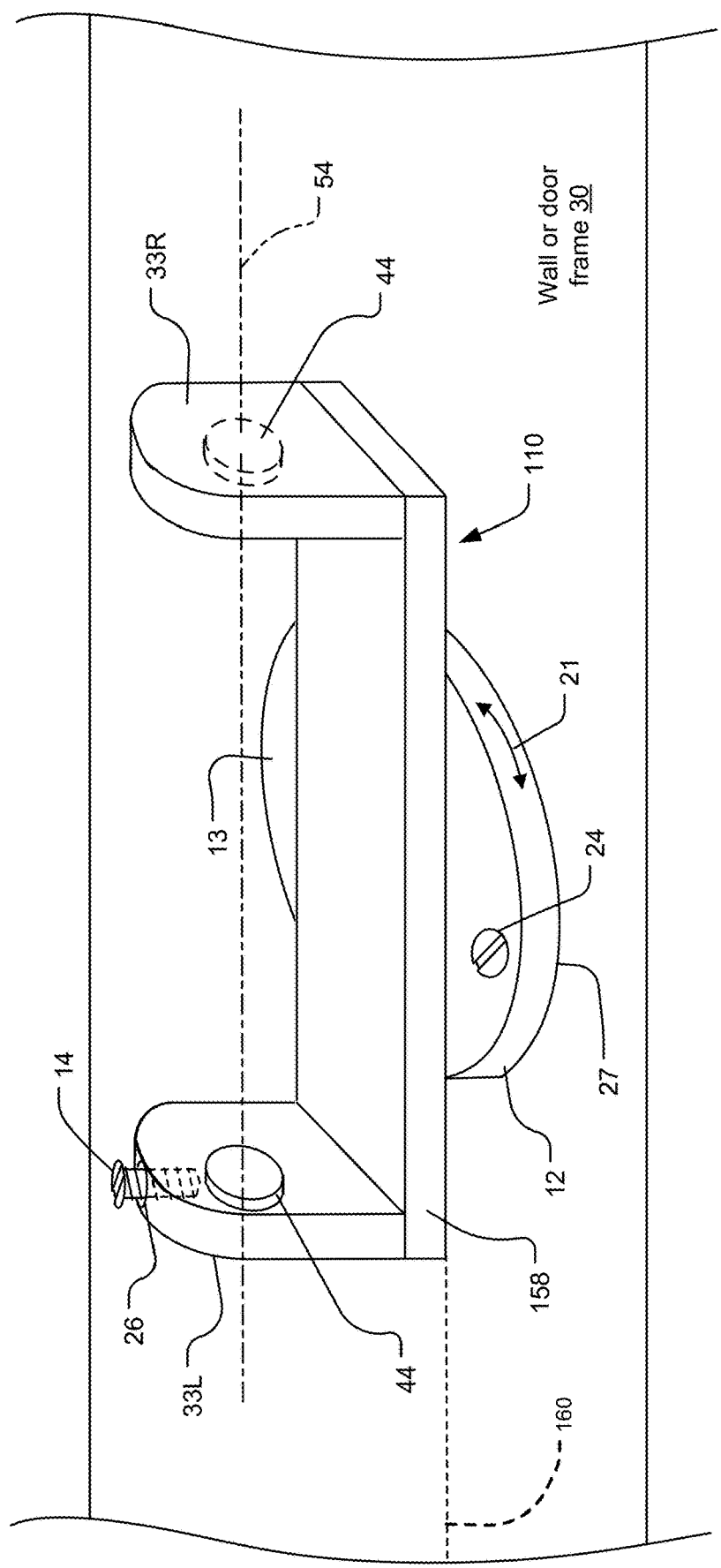
FIG. 2B is a scale perspective view of the mounting bracket of the detector system, where the mounting bracket is mounted to a turntable.

FIG. 2B shows another embodiment of the detector system 20. Here, the mounting bracket 110 of the detector system 20 is mounted to a turntable 12. The turntable 12 is then mounted to a fixed surface such as a wall or door frame 30.

The turntable 12 has a top face 13, a bottom face 27, and a turntable fixing system. In the illustrated example, the turntable fixing system is a set screw 24 that prevents motion of the turntable 12 once the set screw 24 is tightened against the wall or door frame 30. In another example, the turntable fixing system is a thumbscrew.

In the illustrated example, the turntable 12 is attached to the mounting bracket 110. In more detail, the base 158 of the mounting bracket 110 is fastened to the top surface 13 of the turntable 12. In another implementation, the mounting bracket 110 and turntable 12 are formed from a unitary piece of plastic or other material such that the mounting bracket 110 is already integrally attached to the turntable 12.

The turntable 12 is then attached to the wall or door frame 30. For this purpose, the bottom face 27 of the turntable 12 is placed against the wall or door frame 30, and the turntable 12 is mounted to the wall or door frame 30.

The turntable 12 rotates in a direction of rotation indicated by reference 21. Rotation of the turntable 12 enables adjustment of the optical axis 112 beyond that provided by rotating the sensor assembly 50 around its axis of rotation 54. More specifically, rotating the sensor assembly 50 around its axis of rotation 54 enables adjustment of the optical axis 112 in a first plane, and rotating the turntable 12 enables adjustment of the optical axis 112 in a second plane that is different from the first plane.

The turntable 12 also includes a turntable fixing system (here, a set screw 24) for preventing the rotation of the turntable 12. Once the installer has rotated the turntable 12 to make any further adjustments to the optical axis 112 and is satisfied with the adjustments, the installer can tighten the set screw 24 for preventing further rotation of the turntable 12 (and thus fixing the optical axis 112).

Figure 3A:
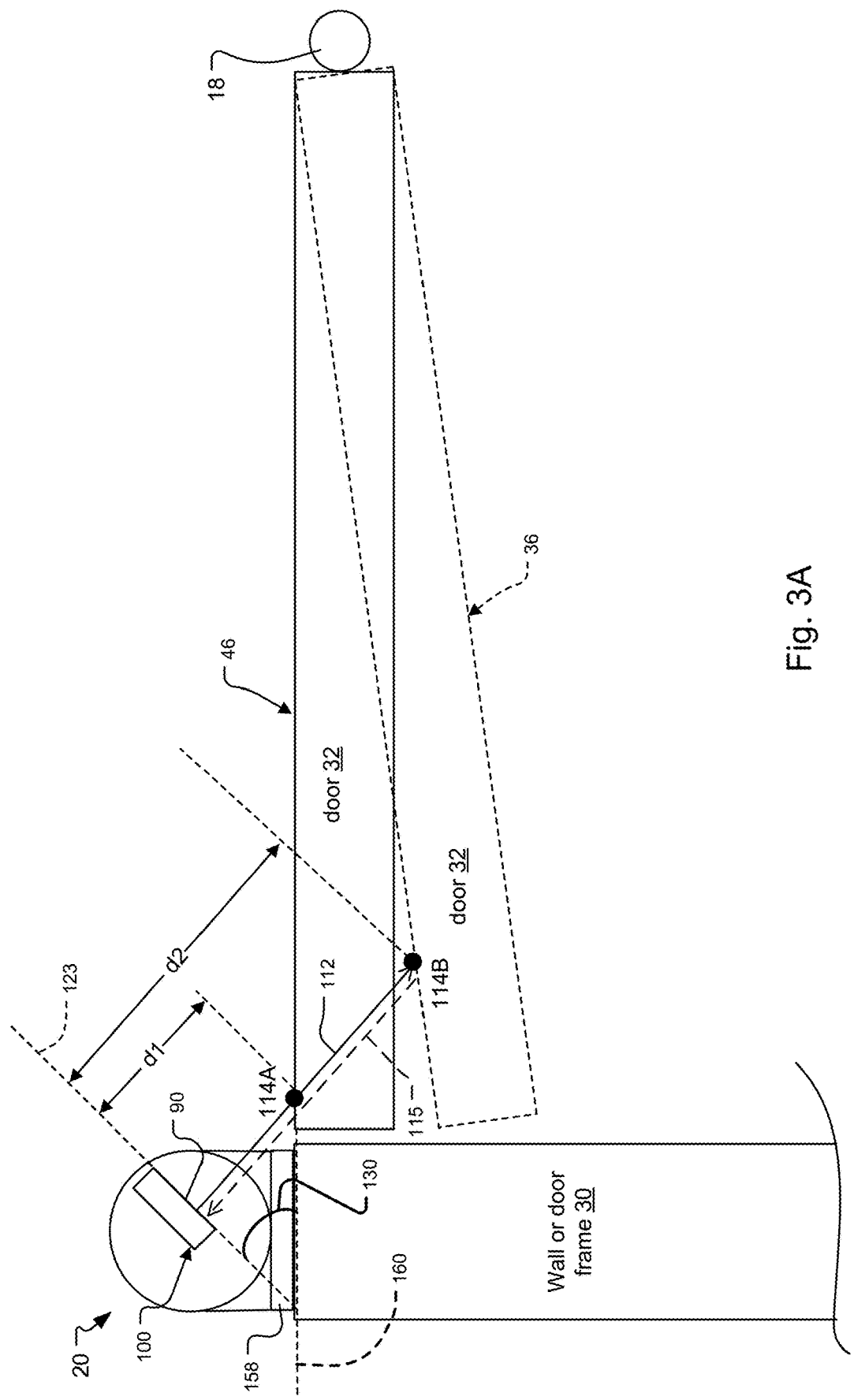
FIG. 3A is a top view of a door system showing one mounting configuration of the detector system in the door system, where the detector system is mounted to a door frame near a side of the door that is opposite hinges of the door, and where the diagram also illustrates an optimal installation angle of the detector system for this configuration.

FIG. 3A shows one mounting configuration of the detector system 20 in a door system. The door system includes a door 32, and a door frame or wall 30. An optimal installation angle 130 of the detector system 20 for this mounting configuration is also shown.

Here, the detector system 20 is mounted to the door frame 30 such that the detector system 20 is located near a side of the door 32 that is opposite hinges 18 of the door. The door 32 rotates around a door axis of rotation provided by the hinges 18.

In more detail, an installer defines a closed door position 46 and an open door position 36 of the door 32. During installation, the installer mounts the detector system 20 to the door frame 30, and then adjusts the optical axis 112 of the sensor module 100. The installer adjusts the optical axis 112 such that one or more beams of light emitted along the optical axis impinge upon the door 32, at measuring points 114A and 114B of closed door position 46 and open door position 36, respectively. To adjust the optical axis 112, the installer might rotate the sensor assembly 50, the turntable 12, or rotate both the sensor assembly 50 and the turntable 12.

In the illustrated example, the installer has adjusted the optical axis 112/installation angle 130 such that the locations of the measuring points 114A and 114B are very close to the detector system 20 itself. Such a location of the measuring points 114 optimizes sensitivity of the detector system 20, thus producing more accurate displacement measurements of the objects under test (here, the moving door 32).

The installation angle 130 of the detector system 20 is measured from a plane 160 of the base 158 of the mounting bracket 110, to a plane 123 that runs parallel to a face 90 of the sensor module 100.

The installation angle 130 typically has an optimal value under the following conditions. The installer rotates the sensor assembly 50 and/or turntable 12 such that the beam of light emitted along optical axis 112 impinges upon the door 32 at measuring points 114A and 114B. In the illustrated example, the locations of the measuring points 114A and 114B are optimal for closed door and open door positions 46 and 36, respectively. Typically, optimal locations for these measuring points 114A and 114B are locations upon the surface of the door 32 that are as close as possible to the detector system 20, and that also reflect the light back to the sensor system 100.

After the beam of light impinges upon the door 32 at measuring points 114A and 114B, the beam of light is reflected back towards the sensor module 100. This reflected light is indicated by reference 115. The sensor module 100 uses the difference between the time at which the beam of light was sent and the time at which the reflected light 115 was received at the sensor module 100 to determine whether displacement of the door 32 has occurred.

In more detail, the sensor module 100 obtains distance measurements to the door 32 over time to determine whether the door 32 has been displaced. To obtain the distance measurements, the analyzing sensor 152 measures the "time of flight" between the time at which the analyzing sensor 152 transmits its beam of light to impinge upon the measuring points 114A and 114B, and the time for the reflected light 115 from the measuring points 114A and 114B to be received by the analyzing sensor 152. A distance is then calculated from each time of flight measurement. Distances d1 and d2 are shown. Distances d1 and d2 correspond to time of flight measurements that the analyzing sensor 152 calculates for measuring points 114A and 114B, respectively.

Figure 3B:
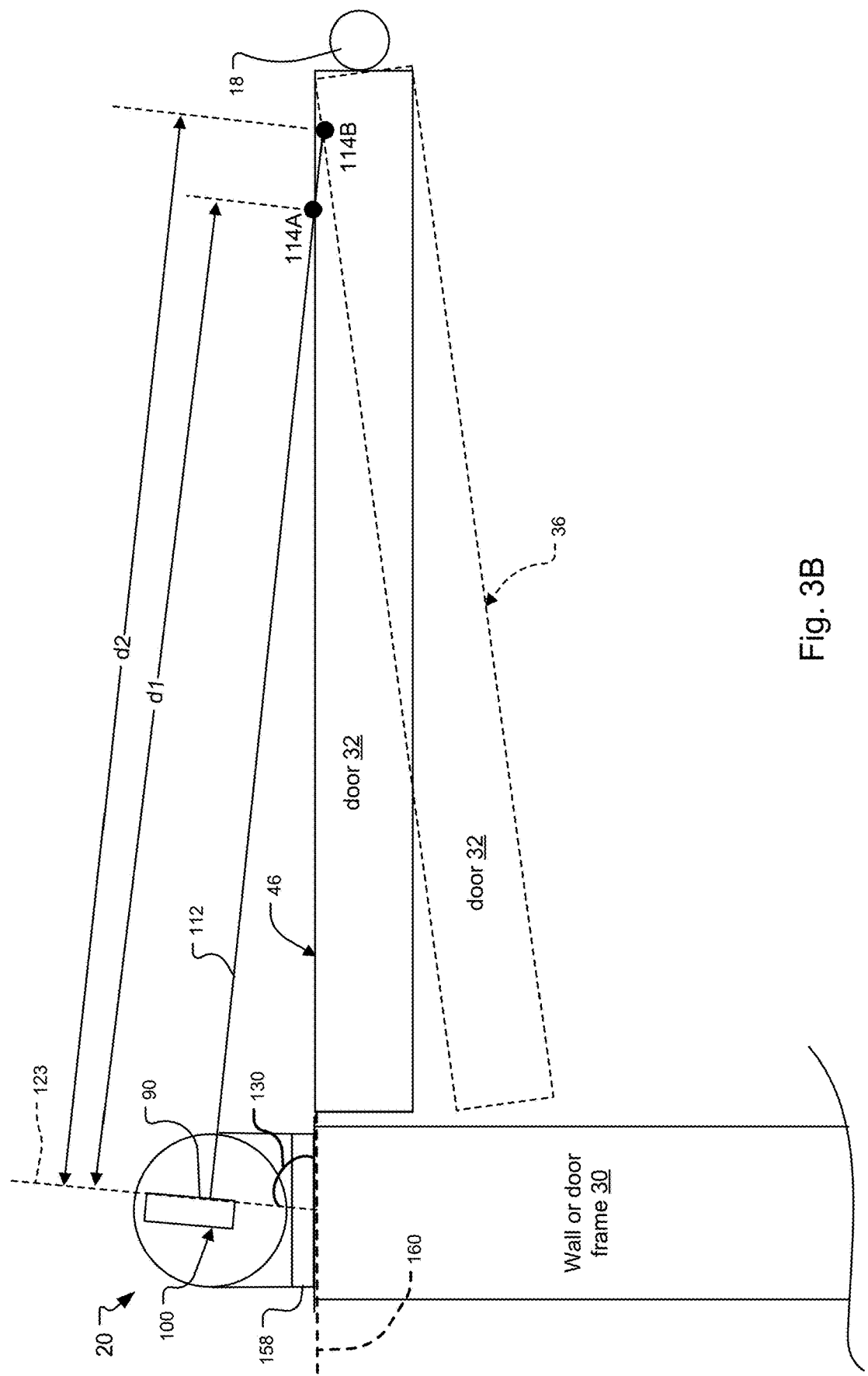
FIG. 3B is a top view of a door system showing a similar mounting configuration of the sensor system as in FIG. 3A, where instead a less than optimal installation angle of the detector system is also shown.

FIG. 3B is a top view of a door system showing the same mounting configuration of the detector system 20 as in FIG. 3A. However, the installer has adjusted the optical axis 112 to provide a less than optimal installation angle 130 of the detector system 20 as compared to that in FIG. 3A.

In FIG. 3B, the installer has adjusted the optical axis 112/installation angle 130 such that the light emitted from the sensor module 100 impinges upon the door 32 at measuring points 114A and 114B. The measuring points 114 are located near the hinges 18/the door axis of the door 32. Here, the locations of the measuring points 114A and 114B are located much further away from the detector system 20 than in the example of FIG. 3A. As a result, distances d1 and d2 are much longer than in FIG. 3A, and the sensitivity of the detector system 20 is decreased as compared to FIG. 3A. Though the detector system 20 will still operate as designed, the less than optimal selection of the/installation angle 130 has other consequences. In one example, the performance of the detector system 20 is impacted, and battery life of the detector system 20 will likely be shortened if the detector system 20 is battery powered. Also, the installation angle 130 selected in FIG. 3B requires the door 32 to travel further in order to detect whether the door 32 is displaced, as compared to FIG. 3A.

Figure 4A:
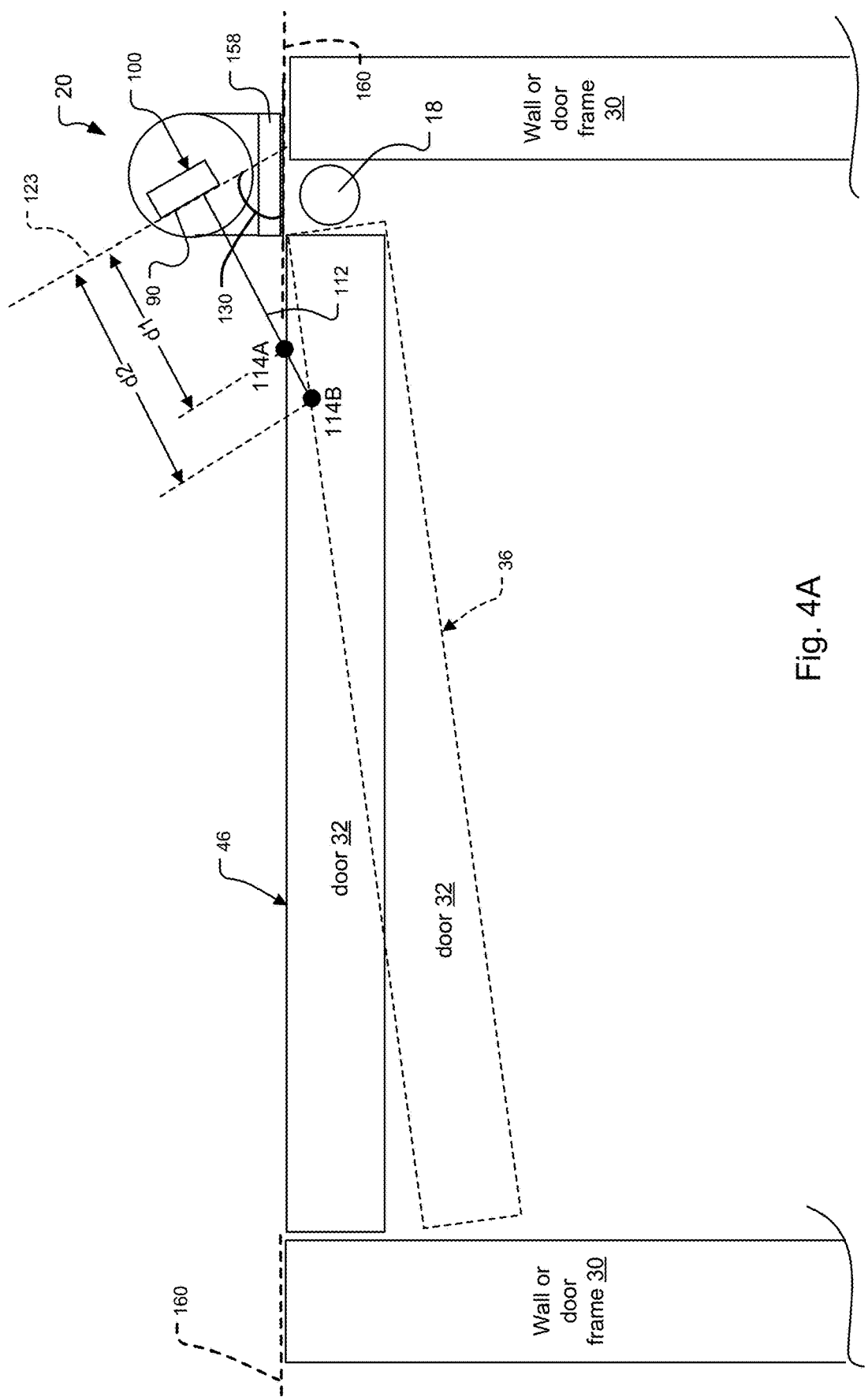
FIG. 4A is a top view of a door system showing another mounting configuration of the detector system in the door system, where the sensor system is mounted to a door frame and is located near the hinges of the door, and where the diagram also illustrates an optimal installation angle of the detector system for this configuration.
Figure 4B:
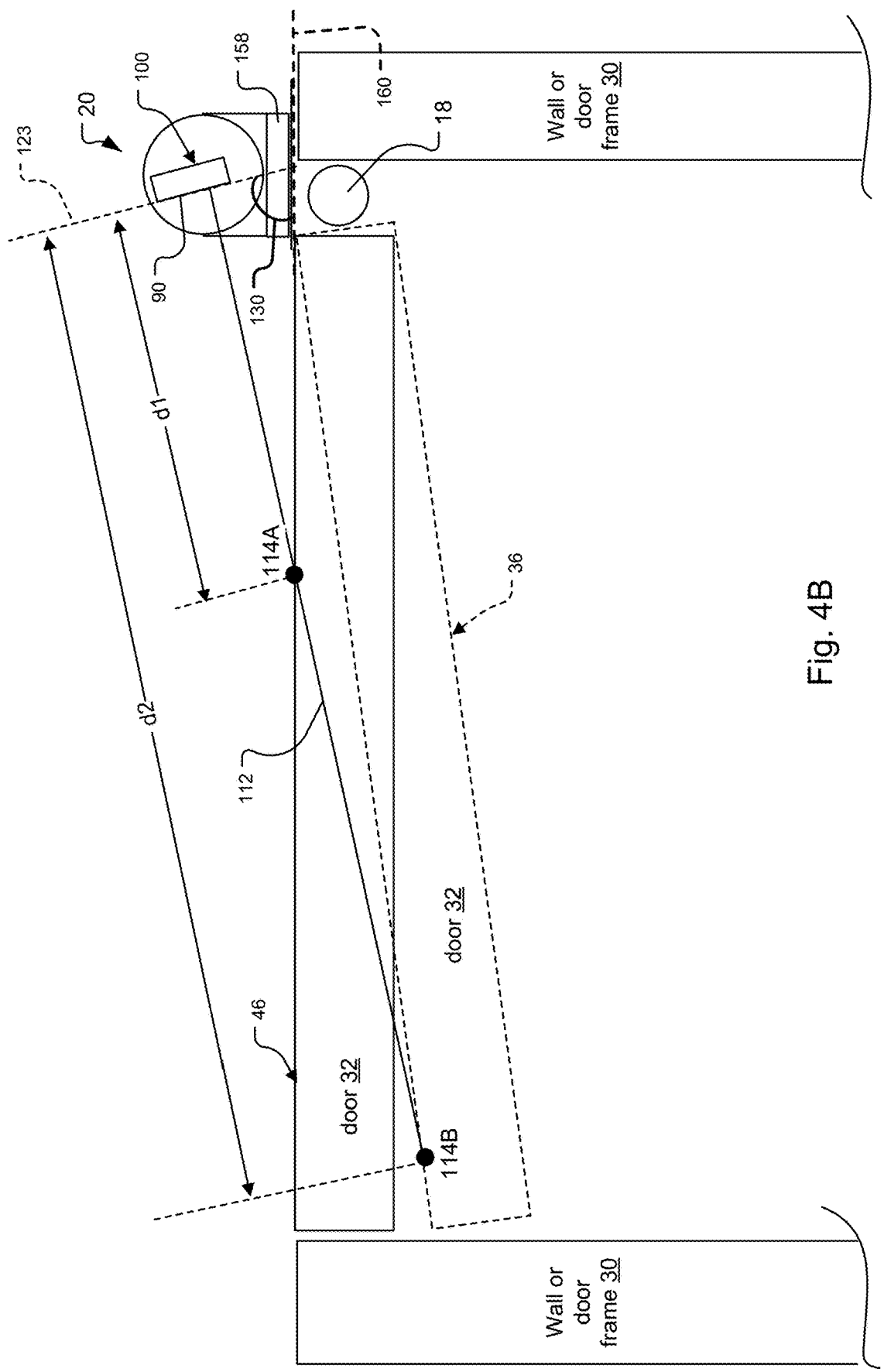
FIG. 4B is a top view of a door system showing a similar mounting configuration of the detector system as in FIG. 4A, where a less than an optimal installation angle of the detector system is also shown.

FIGS. 4A and 4B show a different mounting configuration of the detector system 20 than in FIGS. 3A and 3B. In FIGS. 4A and 4B, the detector system 20 is also mounted to a door frame or wall 30, but is instead located near the hinges 18 of the door 32.

In FIG. 4A, the installer has adjusted the optical axis 112 to provide an optimal installation angle 130 of the detector system 20 for this configuration. As in FIG. 3A, the installer has adjusted the optical axis 112 such that the locations of measuring points 114A and 114B are very close to the detector system 20 itself. This optimizes sensitivity of the detector system 20, and optimizes the value of the installation angle 130.

In FIG. 4B, the installer has adjusted the optical axis 112/installation angle 130 such that the installation angle 130 is not optimal for this configuration. Here, the measuring points 114A and 114B are located much further away from the detector system 20 than in the example of FIG. 4A.

As a result, the sensitivity of the detector system 20 is decreased, and overall performance of the detector system 20 decreases. Also, the installation angle 130 selected in FIG. 4B requires the door 32 to travel further in order to detect whether the door 32 is displaced, as compared to FIG. 4A.

Figure 5:
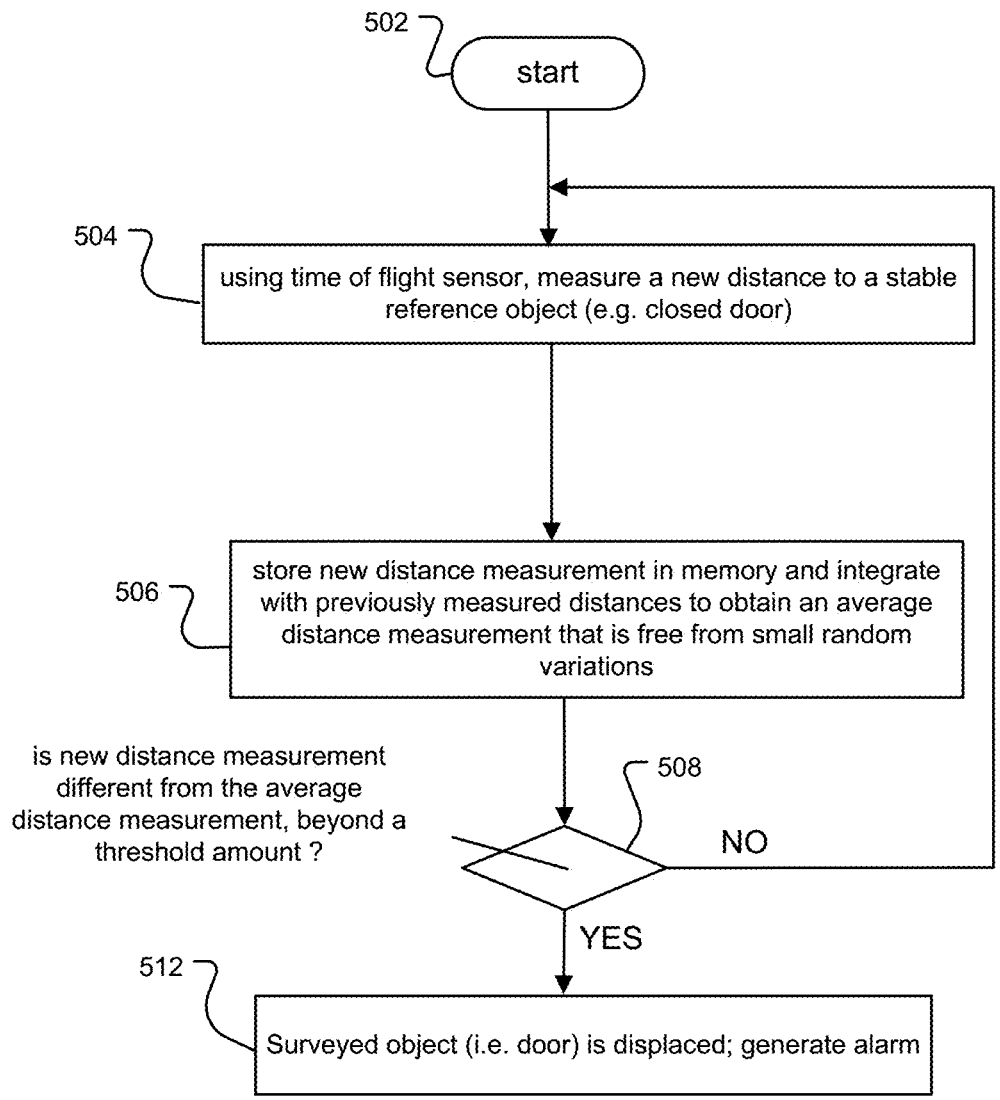
FIG. 5 is a flow diagram showing an exemplary method of a sensor module of the detector system, where the method describes how the sensor module determines whether displacement of an object being monitored by the sensor module has occurred.

FIG. 5 describes an exemplary method for the sensor module 100 of the detector system 20. The method describes how the sensor module 100 determines whether displacement of an object being monitored by the sensor module has occurred. Typically, the method is executed by a controller of the sensor module 100. The method begins in step 502.

In step 504, using the time of flight sensor/analyzing sensor 152, the sensor module 100 measures a new distance to a stable reference object (e.g. closed door 32). According to step 506, the sensor module 100 stores a new distance measurement in memory and integrates the measurement with previously measured distance measurements to obtain an average distance measurement. The average distance measurement is free from small random variations.

In step 508, the sensor module 100 determines whether the new distance measurement is different from the average distance measurement. If the difference between the new and average distance measurements is beyond a threshold amount, the method transitions to step 512. Otherwise, the method transitions to the beginning of step 504 to obtain another (new) distance measurement.

In one example, the threshold amount is as small as 500 micrometers or possibly smaller. In another example, the threshold amount is greater than 500 micrometers and can be 1 centimeter or greater.

In step 512, the sensor module 100 concludes that the surveyed object (i.e. door 32) is displaced, and generates an alarm in response. Here, the sensor module 100 might send an alarm in the form of signal to a control panel. The control panel, in turn, is wired to or wirelessly communicates with the sensor module 100 of the detector system 20.

Figure 6:
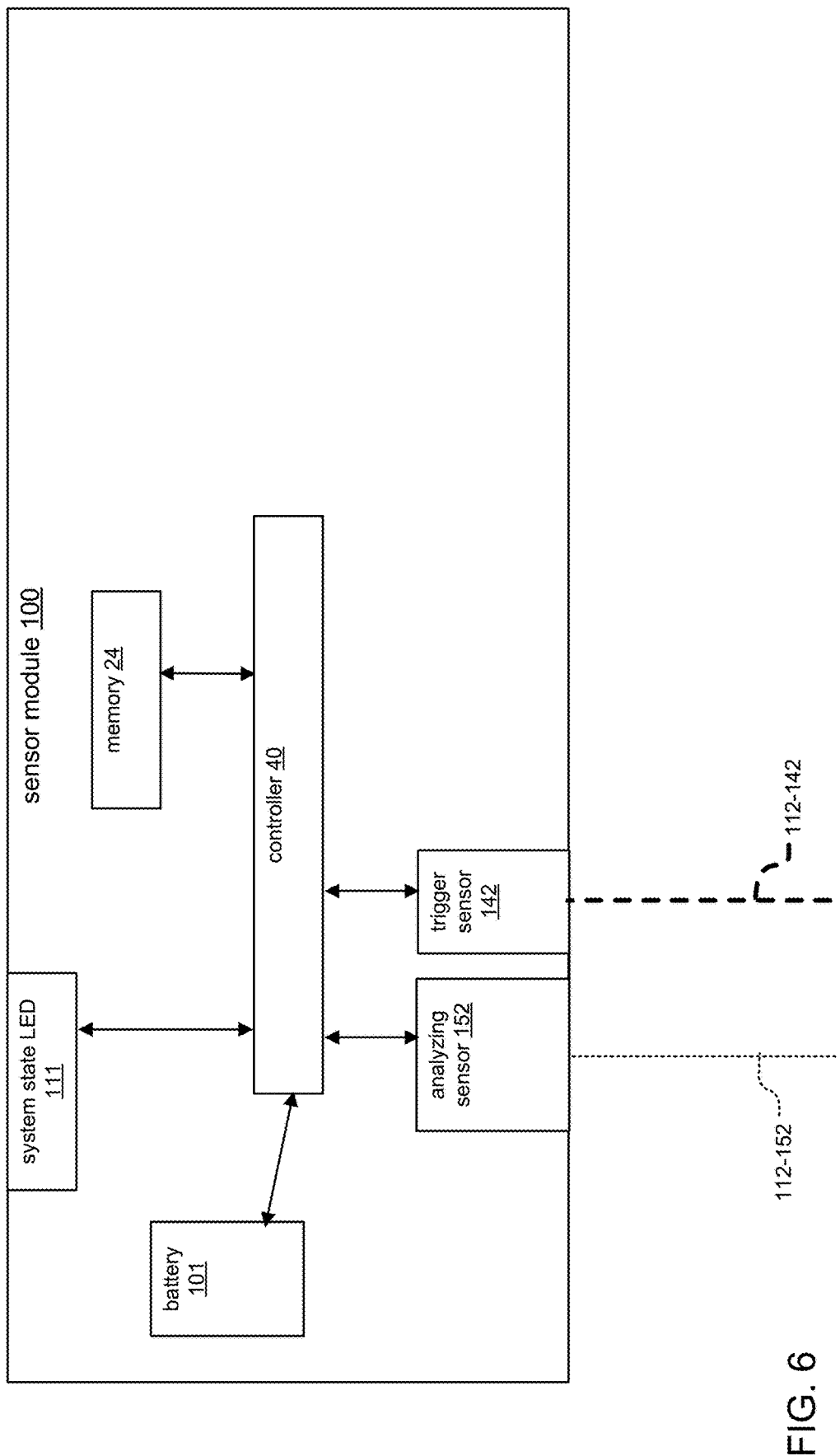
FIG. 6 is a block diagram showing detail for components of the sensor module, according to an embodiment.

FIG. 6 is a block diagram showing detail for components of the sensor module 100, according to an embodiment.

The sensor module 100 includes the trigger sensor 142 and analyzing sensor 152, the battery 101, the system state LED 111, a memory 24, and a controller 40. The controller 40 accesses the memory 24 and monitors and controls the other components.

The battery 101 provides a source of power to the sensor module 100. In examples, the battery 101 might be Nickel-Cadmium (Nicad), Lithium-ion, Nickel Metal Hydride (NiMH), lead acid, or a supercapacitor.

The system state LED 111 signals various states of the detector system 20 to installers, using different colors and/or flashing patterns of light, in examples. In one example, the system state LED 111 flashes yellow when the battery 101 is nearly discharged and should be replaced.

While this invention has been particularly shown and described with references to preferred embodiments thereof, it will be understood by those skilled in the art that various changes in form and details may be made therein without departing from the scope of the invention encompassed by the appended claims.

What is claimed is:

1. A displacement detector system, comprising:
    a mounting bracket;
    a sensor assembly including a housing and a time-of-flight analyzing sensor in the housings;
    wherein the sensor assembly is rotatable with respect to the mounting bracket to adjust a first optical axis of the time-of-flight analyzing sensor for measuring a distance of the time-of-flight analyzing sensor to a surface of a door having a first end and a second end opposite the first end;

wherein, in response to the sensor assembly being adjacent to the first end, the first optical axis is adjustable to impinge upon the surface at a first location that is closer to the first end than the second end, to cause the displacement detector system to measure the distance to the door; and wherein, in response to the sensor assembly being adjacent to the second end, the first optical axis is adjustable to impinge upon the surface at a second location that is closer to the second end than the first end, to cause the displacement detector system to measure the distance to the door.

2. The displacement detector system as claimed in claim 1, wherein the mounting bracket comprises a base and two arms projecting from either end of the base, wherein the sensor assembly is held between the two arms.

3. The displacement detector system as claimed in claim 2, wherein the two arms of the mounting bracket have recesses that receive bosses of the housing of the sensor assembly.

4. The displacement detector system as claimed in claim 1, further comprising a sensor assembly fixing system for preventing rotation of the sensor assembly in the mounting bracket.

5. The displacement detector system as claimed in claim 4, wherein the sensor assembly fixing system comprises a set screw.

6. The displacement detector system as claimed in claim 1, wherein the housing of the sensor assembly comprises a body portion and a window set in the body portion, the time-of-flight analyzing sensor being mounted behind the window.

7. The displacement detector system as claimed in claim 1, wherein the housing is generally cylindrical.

8. The displacement detector system as claimed in claim 1, further comprising a turntable, wherein the mounting bracket is mounted to the turntable.

9. The displacement detector system as claimed in claim 8, wherein the turntable includes a turntable fixing system for preventing a rotation of the turntable.

10. The displacement detector system of claim 1, wherein the sensor assembly further comprises a trigger sensor having a second optical axis that is substantially parallel to the first optical axis of the time-of-flight analyzing sensor, wherein the trigger sensor is configured for activating the time-of-flight analyzing sensor upon detection of a movement of the door.

11. The displacement detector system of claim 10, wherein the trigger sensor comprises an optical proximity detector or an accelerometer.

12. The displacement detector system of claim 1, wherein the door is rotatable about a door axis that is adjacent to the first end and opposite to the second end.

13. A method of installing a displacement detector system, comprising:

rotating a sensor assembly held in a mounting bracket to adjust a first optical axis of a time-of-flight analyzing sensor of the sensor assembly for measuring a distance of the time-of-flight analyzing sensor to a surface of a door having a first end and a second end opposite the first end, wherein rotating the sensor assembly includes:

adjusting, in response to the sensor assembly being adjacent to the first end, the first optical axis to impinge upon the surface of the door at a first location that is closer to the first end than the second end; and adjusting, in response to the sensor assembly being adjacent to a second end, the first optical axis to impinge upon the surface at a second location that is closer to the second end than the first end; and fixing the sensor assembly in the mounting bracket.

14. The method as claimed in claim 13, wherein rotating of the sensor assembly further includes pointing the first optical axis upon the surface of the door for detecting displacement of the door.

15. The method as claimed in claim 13, wherein fixing the sensor assembly in the mounting bracket includes fixing the first optical axis upon the surface of the door for detecting displacement of the door.

16. The method as claimed in claim 13, wherein fixing the sensor assembly in the mounting bracket includes using a sensor assembly fixing system for preventing a rotation of the sensor assembly with respect to the mounting bracket.

17. The method as claimed in claim 13, further comprising rotating a turntable attached to the mounting bracket to further adjust the first optical axis.

18. The method as claimed in claim 17, wherein rotating the sensor assembly adjusts the first optical axis in a first plane, and wherein rotating the turntable adjusts the first optical axis in a second plane that is different from the first plane.

19. The method as claimed in claim 17, further comprising fixing the turntable.

20. The method as claimed in claim 19, wherein fixing the turntable includes using a turntable assembly fixing system for preventing a rotation of the turntable.

21. A displacement detector system, comprising:

a cylindrical sensor assembly comprising:

a time-of-flight analyzing sensor having a first optical axis and configured for measuring a distance to a surface of a door having a first end and a second end opposite the first end; and an optical proximity detector having a second optical axis that is substantially parallel to the first optical axis of the time-of-flight analyzing sensor, wherein the optical proximity detector is configured for activating the time-of-flight analyzing sensor upon detection of a movement of the door;

a bracket for mounting the cylindrical sensor assembly, wherein the cylindrical sensor assembly is rotatable with respect to the bracket to adjust the first optical axis of the time-of-flight analyzing sensor in a first plane for measuring the distance of the time-of-flight analyzing sensor to the door;

wherein, in response to the cylindrical sensor assembly being adjacent to the first end, the first optical axis is adjustable to impinge upon the surface at a first location that is closer to the first end than the second end, to cause the displacement detector system to measure the distance to the door;

wherein, in response to the cylindrical sensor assembly being adjacent to the second end, the first optical axis is adjustable to impinge upon the surface at a second location that is closer to the second end than the first end, to cause the displacement detector system to measure the distance to the door; and a turntable for mounting the bracket thereon, wherein the bracket is rotatable with the turntable to further adjust the first optical axis of the time-of-flight analyzing sensor in a second plane that is different than the first plane.

\* \* \* \* \*

UNITED STATES PATENT AND TRADEMARK OFFICE
CERTIFICATE OF CORRECTION

PATENT NO. : 10,718,147 B2  
APPLICATION NO. : 15/947036  
DATED : July 21, 2020  
INVENTOR(S) : Boris Zhevelev and Eli Litvak Page 1 of 1

It is certified that error appears in the above-identified patent and that said Letters Patent is hereby corrected as shown below:

In the Specification

Column 4, Line 4, delete "atop" and insert -- a top --, therefor.

Signed and Sealed this  
Eighth Day of December, 2020

Andrei Iancu  
*Director of the United States Patent and Trademark Office*